United States Patent
Jakobsson et al.

(10) Patent No.: US 6,615,206 B1
(45) Date of Patent: Sep. 2, 2003

(54) TECHNIQUES FOR ELIMINATING DATABASE TABLE JOINS BASED ON A JOIN INDEX

(75) Inventors: Hakan Jakobsson, San Francisco, CA (US); Ari Mozes, San Carlos, CA (US); Andrew Witkowski, Foster City, CA (US); Fei Ge, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 10/186,461

(22) Filed: Jun. 28, 2002

Related U.S. Application Data
(60) Provisional application No. 60/326,346, filed on Sep. 28, 2001, and provisional application No. 60/378,841, filed on May 7, 2002.

(51) Int. Cl.[7] ............................................. G06F 17/30
(52) U.S. Cl. ............................................ 707/3; 707/4
(58) Field of Search ........................... 707/1, 2, 3, 4, 707/5, 100, 101

(56) References Cited

U.S. PATENT DOCUMENTS

| | | | | | |
|---|---|---|---|---|---|
| 6,167,399 | A | * | 12/2000 | Hoang .............................. | 707/5 |
| 6,397,204 | B1 | * | 5/2002 | Liu et al. ........................ | 707/2 |
| 6,438,542 | B1 | * | 8/2002 | Koo et al. ...................... | 707/4 |
| 6,446,063 | B1 | * | 9/2002 | Chen et al. ..................... | 707/4 |

* cited by examiner

*Primary Examiner*—Charles Rones
*Assistant Examiner*—Yicun Wu
(74) *Attorney, Agent, or Firm*—Thomas J. Treutler; Hickman Palermo Truong & Becker LLP

(57) ABSTRACT

Techniques for processing, in a database management system, a query referencing a plurality of tables of a database include determining whether a join should be performed between a first table and a second table. The determination is based on a particular set of one or more columns of the second table referenced in the query and a join index on the first table for an index key column from the second table. If it is determined that the join should not be performed, the query is processed without performing the join between the first table and the second table. By avoiding one or more joins, substantial savings in the consumption of computational resources are achieved.

18 Claims, 10 Drawing Sheets

110 STORES TABLE

| 111 STORE_ID COLUMN | 113 STREET COLUMN | 115 CITY COLUMN | 117 STATE COLUMN | 119 MANAGER COLUMN | 114 ••• |
|---|---|---|---|---|---|
| 1023 | 1010 MAIN | SAN JOSE | CA | TJSMITH | 112a ROW |
|  |  |  |  |  | • • • 116 |
| 1432 | 16 PINE | FAIRFAX | VA | STJONES | 112b ROW |

120 PRODUCTS TABLE

| 121 PROD_ID COLUMN | 123 SOURCE COLUMN | 125 NAME COLUMN | 127 COST COLUMN | 129 CATEGORY COLUMN | 124 ••• |
|---|---|---|---|---|---|
| 117 | ABC CO. | CHIPS-O | 0.47 | SNACKS | 122a ROW |
|  |  |  |  |  | • • • 126 |
| 589 | ZZ CORP. | MINTY CAP | 0.18 | CANDY | 122b ROW |

130 SALES TABLE

| 131 SALE_ID COLUMN | 133 STORE ID COLUMN | 135 PROD_ID COLUMN | 137 PRICE COLUMN | 139 DATE COLUMN | 134 ••• |
|---|---|---|---|---|---|
| 67890 | 1023 | 117 | 0.95 | 11/15/01 | 132a ROW |
|  |  |  |  |  | • • • 136 |
| 76543 | 1023 | 117 | 1.00 | 12/17/01 | 132b ROW |

FIG. 2A

```
210 JOIN INDEX ON SALES TABLE, STARTING ON ROW 67890
FOR STORES.STATE COLUMN
WHERE SALES.STORE_ID = STORES.STORE_ID:       ⎯ 212a INDEX ENTRY
┌─────────────────────────────────────────┐
│ "CA",     10000100 . . . 1              │
├─────────────────────────────────────────┤
│ "MA",     00101000 . . . 0              │
└─────────────────────────────────────────┘
                                            ⎯ 212b INDEX ENTRY
              • ⎯ 215
              •
              •                             ⎯ 212c INDEX ENTRY
┌─────────────────────────────────────────┐
│ "VA",     00010000 . . . 0              │
└─────────────────────────────────────────┘
```

FIG. 2B

```
220 JOIN INDEX ON SALES TABLE, STARTING ON ROW 67890
FOR PRODUCTS.CATEGORY COLUMN
WHERE SALES.PROD_ID = PRODUCTS.PROD_ID:       ⎯ 222a INDEX ENTRY
┌─────────────────────────────────────────┐
│ "SNACKS",      10001100 . . . 1         │
├─────────────────────────────────────────┤
│ "CANDY" ,      01100000 . . . 0         │
└─────────────────────────────────────────┘
                                            ⎯ 222b INDEX ENTRY
              • ⎯ 225
              •
              •                             ⎯ 222c INDEX ENTRY
┌─────────────────────────────────────────┐
│ "SANDWICHES", 00010011 . . . 0          │
└─────────────────────────────────────────┘
```

FIG. 5

510 DATA STRUCTURE INDICATING ROWS SATISFYING
CONDITIONS ON MULTIPLE TABLES WITH INDEXES
FOR SNACKS OR SANDWICHES IN MASSACHUSETTS

512a ENTRY

"SNACKS IN MA",          00001000 . . . 0

"SANDWICHES IN MA",      00000000 . . . 0

512b ENTRY

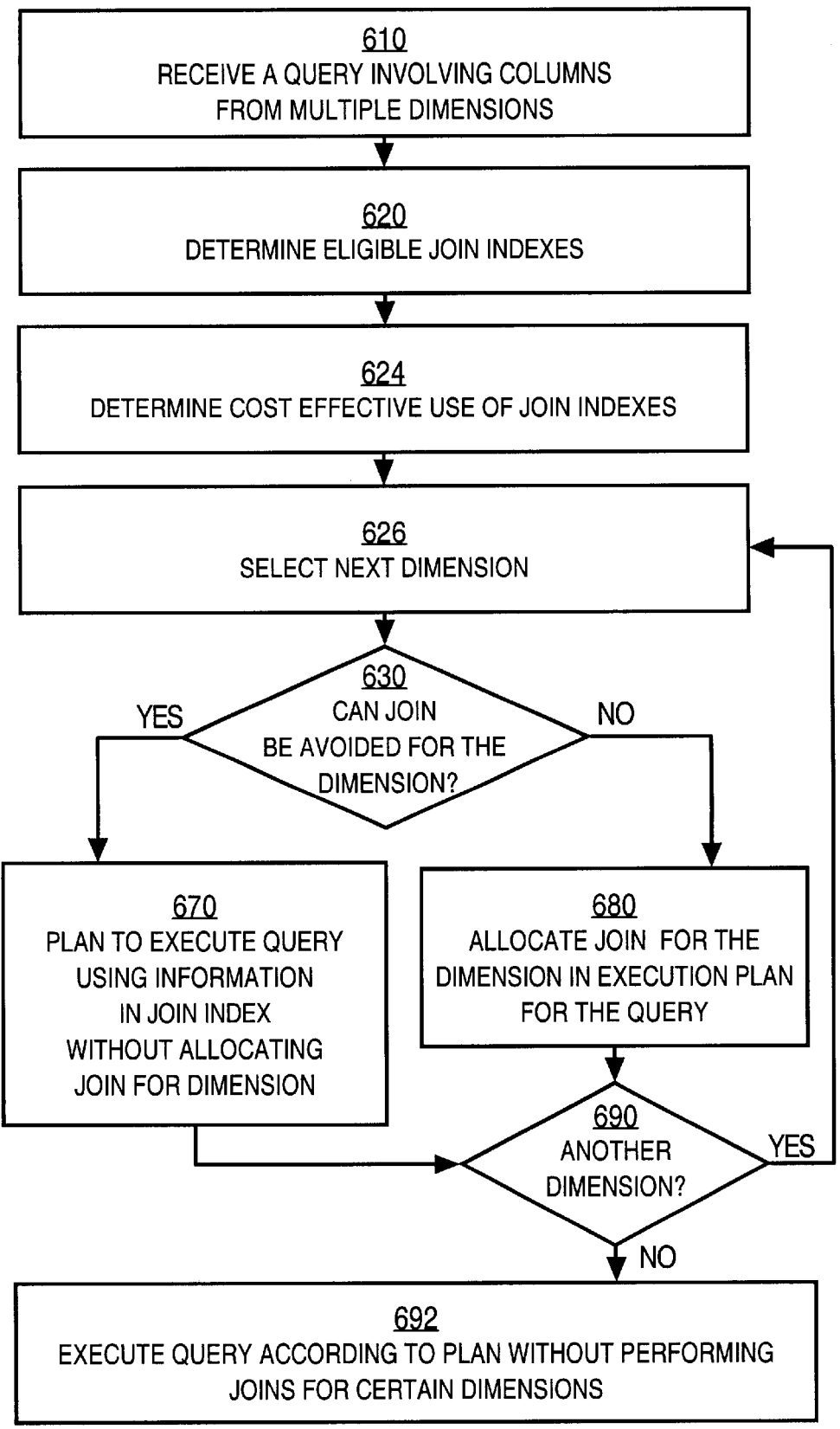

TECHNIQUES FOR ELIMINATING DATABASE TABLE JOINS BASED ON A JOIN INDEX

CROSS REFERENCE TO RELATED APPLICATION

This application claims benefit of Provisional Application Ser. No. 60/326,346, filed Sep. 28, 2001, the entire contents of which are hereby incorporated by reference as if fully set forth herein, under 35 U.S.C. §119(e). This application also claims benefit of Provisional Application Ser. No. 60/378,841, filed May 7, 2002, entitled "Techniques for Eliminating Database Table Joins Based on a Join Index," by inventors Hakan Jakobsson, Ari Mozes, Andrew Witkowski and Fei Ge, under 35 U.S.C. §119(e).

FIELD OF THE INVENTION

The present invention relates to optimizing database queries, and in particular to using one or more join indexes to eliminate one or more table join operations.

BACKGROUND OF THE INVENTION

In a database management system (DBMS), data is stored in one or more data containers. Each container contains records. The data within each record is organized into one or more fields. In relational database systems, the data containers are referred to as tables, the records are referred to as rows, and the fields are referred to as columns.

In typical database systems, users store, update and retrieve information by submitting commands to a database server. To be correctly processed, the commands must comply with the database language that is supported by the database server. One popular database language is known as Structured Query Language (SQL). A command that retrieves data from the database is called a query.

A join is a query that combines rows from two or more tables. A join is performed whenever multiple tables appear in an SQL query's FROM clause. The columns of data retrieved from the tables are listed in the SQL query's SELECT clause. The query's SELECT list can include any columns from any of the base tables listed in the FROM clause. In SQL, a condition predicate ("a predicate"), which is a condition that must be satisfied by the rows from which the data are retrieved, may be specified in a WHERE clause. Most join queries contain WHERE clause conditions that compare two columns, each from a different table. Such a condition is called a join condition. To execute a join, the DBMS combines pairs of rows for which the join condition evaluates to TRUE, where each pair contains one row from each table.

To execute a join of three or more tables, the DBMS often joins two of the tables based on the join conditions comparing their columns and then joins the result to another table based on join conditions containing columns of the joined tables and the new table. The DBMS continues this process until all tables are joined into the result. Joins involving many tables, or a table with many rows, can quickly explode into a very large number of row combinations. Such joins can cause a database server to consume considerable computational resources.

To improve performance of queries involving joins, a join index may be formed. A database index is conceptually similar to a normal index found at the end of a book, in that both kinds of indexes comprise a list of information accompanied with the location of the information. Values in one or more columns of a table are stored in an index along with data indicating one or more rows in the table having those values. The index is often maintained separately from the actual database table. A join index is an index on a table T for a column of a different table D related to table T through a join. The column from table D is the index key column. The index key column is typically different from the column or columns used in the join condition. The join index stores data uniquely indicating rows of T that are associated with each value of the index key column, subject to the join conditions that are used in the index definition.

Join indexes can be used to greatly reduce the volume of data that must be joined to satisfy a query by reducing the number of rows of T that are joined. For example, if the table T has 100,000 rows equally distributed across 10 values for the index key column, then a join that constrains the index key column to have a particular value, will list only 10,000 rows in the index associated with the particular value. Then only those 10,000 rows of table T are joined to the table D.

Multiple join indexes can reduce the volume of data that must be joined even further. For example, rows of table T may be associated with values in an index key column of table D1 in a first join index and with values in a index key column of table D2 in a second join index. If table T has its 100,000 rows equally distributed across the 10 values for the index key column in both the first join index and the second join index, then a join which constrains the index key columns of both join indexes to have respective particular values will only list 10,000 rows from each join index with the respective particular values. The list of 10,000 rows of table T from the first join index and the list of 10,000 rows of table T from the second join index are compared, and only rows that appear in both lists satisfy both constraints. If the lists are uncorrelated, only 1000 rows will appear in both lists, and only 1000 rows of table T will be joined back to tables D1 and D2 to perform the query.

Although computational savings are achieved using multiple join indexes, the computational resources still consumed can be extensive.

Based on the foregoing, there is a clear need to eliminate join operations whenever possible.

SUMMARY OF THE INVENTION

Techniques are provided for processing, in a database management system, a query that specifies a join between multiple tables of a database. According to one aspect of the invention, the query specifies a join between a first table and a second table, and the techniques include determining whether a join should actually be performed between the first table and the second table. The determination is based on (1) a particular set of one or more columns of the second table referenced in the query and (2) a join index on the first table for an index key column from the second table. If it is determined that the join should not be performed, the query is processed without performing the join between the first table and the second table.

According to an embodiment of this aspect, the step of determining whether the join should be performed includes determining whether a query execution operation preserves an association between a row in the first table and a value of the index key column.

According to another embodiment, the step of determining whether the join should be performed includes determining whether the query execution operation selects every row of the first table that satisfies all conditions in the query on the particular set of columns and selects no other row.

These techniques allow substantial savings in the consumption of computational resources to be achieved by avoiding one or more joins when possible.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates an example database with two relatively small dimension tables and a relatively large fact table, which shall be used in examples that describe embodiments of the invention;

FIG. 2A and FIG. 2B are block diagrams that illustrate two example bitmap join indexes 210, 220, respectively, for the tables of FIG. 1, according to an embodiment;

FIG. 5 is a block diagram that illustrates an example data structure that stores results of an AND operation on entries from two join indexes, according to an embodiment;

FIG. 6A is a flowchart illustrating at a high level a method for avoiding joins while processing a query involving columns from multiple tables of a database using one or more join indexes, according to an embodiment;

DETAILED DESCRIPTION OF THE PREFERRED EMBODIMENT

Figure 3A:
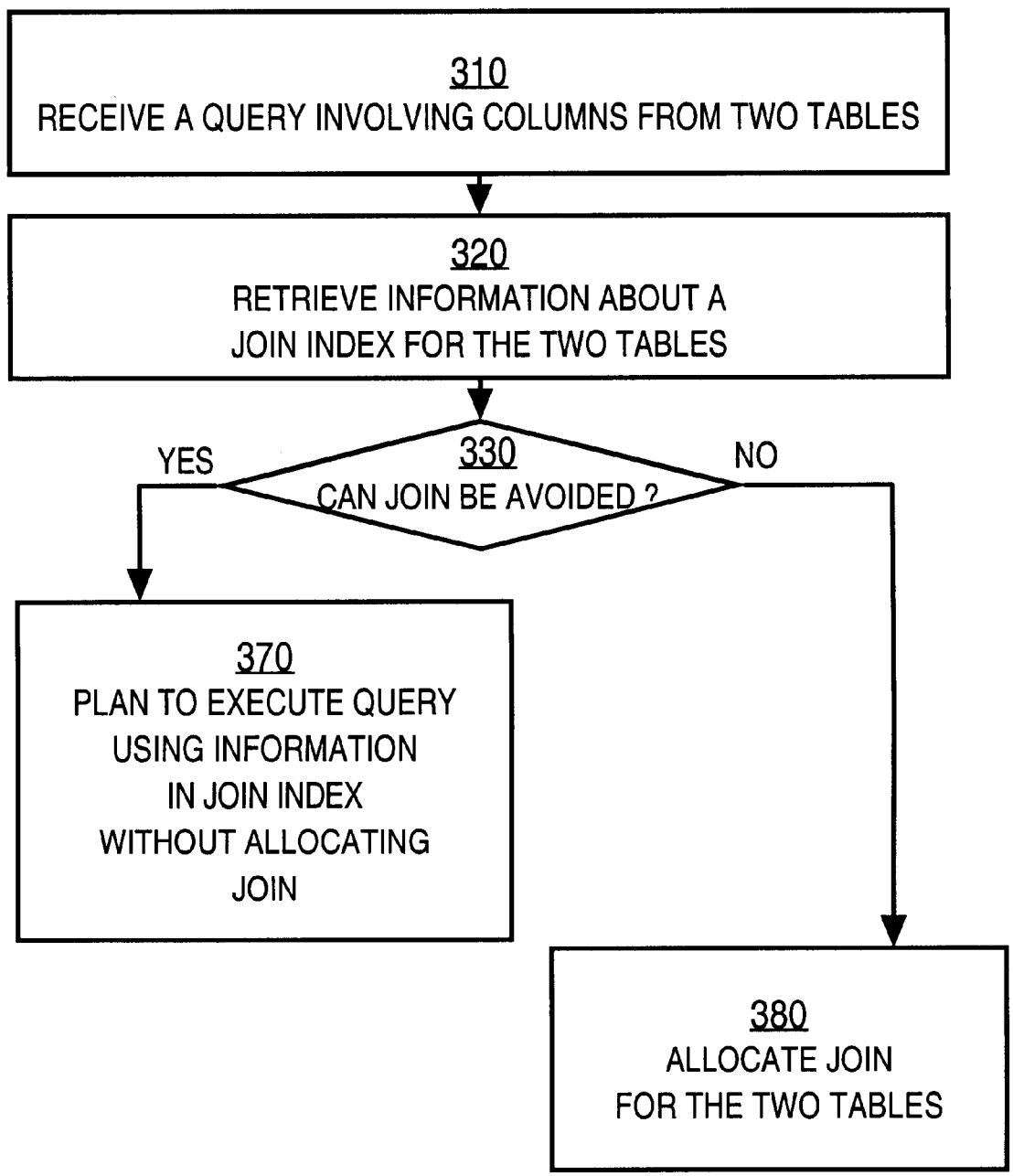
FIG. 3A is a flowchart illustrating at a high level a method for avoiding joins while processing a query involving columns from two tables of a database using a join index, according to an embodiment.

A method and apparatus for eliminating table joins based on one or more join indexes are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OPERATIONAL CONTEXT

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

In particular, embodiments are described in which a database includes a star schema, but the invention is not limited to star schemas. A star schema involves one or more relatively large tables called fact tables and several relatively small tables called dimension tables. The fact tables include references to one or more rows stored in the dimension tables. An example star schema with one fact table and two dimension tables is described in the next section.

EXAMPLE FACT AND DIMENSION TABLES

FIG. 1 is a block diagram that illustrates an example database 100 with two relatively small dimension tables 110, 120 and a relatively large fact table 130. Embodiments of the invention are described with reference to the example database 100.

A STORES table 110 is a dimension table that includes information about retail outlets of a retail company arranged in columns and rows. Each row represents a different store. It is assumed in the example that there are fewer than 400 stores and therefore fewer than 400 rows in the STORES table 110. A STORE_ID column 111 in each row holds data indicating a unique identifier for the store represented by the row. A STREET column 113 in each row holds data indicating a street address for the store represented by the row. A CITY column 115 in each row holds data indicating a city where the store represented by the row is located and a STATE column 117 holds data indicating a state where the store is located. A MANAGER column 119 in each row holds data indicating a name of a manager for the store represented by the row. Ellipsis 114 indicates other columns for the STORES table 110 that are not relevant for illustrating embodiments of the invention. In a first row 112a of the table, data indicates a store having a STORE_ID value of "1023" located at "1010 Main" in "San Jose" "Calif." (California). The store manager is T. J. Smith as indicated by the value "TJSMITH" in the MANAGER column. In a subsequent row 112b of the table, data indicates a store having a STORE_ID value of "1432" located at "16 Pine" in "Fairfax" "Va." (Virginia). The store manager is S. T. Jones as indicated by the value "STJONES" in the MANAGER column. Ellipsis 116 indicates other intervening rows in the STORES table 110.

A PRODUCTS table 120 is a dimension table that includes information about products sold by the retail company arranged in columns and rows. Each row represents a different product. It is assumed in the example there are fewer than 2000 products and therefore fewer than 2000 rows in the PRODUCTS table. A PROD_ID column 121 in each row holds data indicating a unique identifier for the product represented by the row. A SOURCE column 123 in each row holds data indicating a supplier for the product represented by the row. A NAME column 125 in each row holds data indicating a product name. A COST column 127 holds data indicating a cost to the retail company of obtaining the product. A CATEGORY column 129 in each row holds data indicating a category for the product represented by the row. It is assumed for purposes of illustration, that the CATEGORY column 129 can have values of "candy," "snacks," "sandwiches," and "drinks". Ellipsis 124 indicates other columns for the PRODUCT table 120 that are not relevant for illustrating embodiments of the invention. In a first row 122a of the table, data indicates a product having a PROD_ID value of "117" from source "ABC Co." that has a product name of "Chips-O" and costs $0.47. The product category is "snacks." In a subsequent row 122b of the table, data indicates a product having a PROD_ID value of "589" from source "ZZ Corp." that has a product name of "Minty Cap" and costs $0.18. The product category is "candy." Ellipsis 126 indicates other intervening rows in the PRODUCTS table.

A SALES table 130 is a fact table that includes information about individual sales made by the retail company arranged in columns and rows. Each row represents a different sale. It is assumed there are over 200,000 sale transactions over the 400 stores and therefore more than 200,000 rows in the SALES table 130. A SALE_ID column 131 in each row holds data indicating a unique identifier for the sales transaction represented by the row.

A STORE_ID column 133 in each row holds data indicating the retail outlet where the sale represented by the row is made. Additional information about the store where the sale is made can be obtained from the STORES table 110 in the row having the same value for the STORE_ID column. The columns in the two tables need not have the same name; but, to simplify the description, it is assumed that the corresponding columns in both the SALES table 130 and the STORES table 110 are named STORE_ID. A PROD_ID column 135 in each row holds data indicating the product sold in the sale represented by the row. Additional information about the product sold can be obtained from the PRODUCTS table in the row having the same value for the PROD_ID column. The columns in the two tables need not have the same name; but, to simplify the description, it is assumed that the corresponding columns in both the SALES table 130 and the PRODUCTS table are named PROD_ID. Other information in each row of the SALES table 130 in FIG. 1 includes a PRICE column and a DATE column for the date of sale. Ellipsis 134 indicates other columns for the SALES table 130 120 that are not relevant for illustrating embodiments of the invention.

In a first row 132*a* of the SALES table 130, data indicates a sale transaction having a SALE_ID value of "67890" representing a sale at store "1023" for product "117" sold at a price of $0.95 on Nov. 15, 2001. In a subsequent row 132*b* of the table, data indicates a sale transaction having a SALE_ID value of "76543" representing a sale at store "1023" for product "117" sold at a price of $1.00 on Dec. 17, 2001. Ellipsis 136 indicates other intervening rows in the SALES table 130. It is assumed that rows 132*a* through 132*b* represent 8654 rows of the SALES table 130. Other rows of the over 200,000 rows in the SALES table 130 occur before or after rows 132*a* through 132*b*.

The STORE_ID and PROD_ID columns of the SALES table 130 illustrate a feature of the star schema: detailed information about the stores and products do not have to be included in the SALES table 130 and repeated for each sale. The information is stored once in a row in one of the dimension tables and referenced by a unique number indicating that entire row. The total size of the database 100 is smaller than if all the information in a row of the STORES table 110 and a row of the PRODUCTS tables were repeated for each sale. The information about the stores and products can be updated separately in only the few affected rows; and the SALES table 130 is automatically up-to-date, as long as the values of the STORE_ID and the PROD_ID do not change.

JOIN INDEX

It is assumed for purposes of illustration that two join indexes are formed for the database 100. A first join index is formed to indicate rows in the SALES table 130 for each value of a state where a store is located, as indicated by the STATE column 117. In other words, the first join index indicates, for each particular state that appears in the STATE column 117 of STORES table 110, the rows in SALES table 130 correspond to sales in that particular state.

A second join index is formed to indicate rows in the SALES table 130 for each value of a category for a product as indicated by the CATEGORY column 129 of PRODUCTS table 120.

In the present example, a join index is not utilized to find a particular store ID value in the SALES table 130 because a regular index can be built on the store ID column 133 of the SALES table 130 to provide that capability.

As mentioned above, in a join index, each value (the "indexed value") for one or more columns (the "indexed column(s)") of one table is associated with zero or more rows of a different table, described by the join condition in the index definition.

In the first join index of the illustrated embodiment, the indexed values are the values found in the STATE column 117 of the STORES table 110 and the associated rows are rows in the SALES table 130 associated with stores located in those states. In the second join index of the illustrated embodiment, the indexed value is a value found in the CATEGORY column 129 of the PRODUCTS table and the associated rows are rows in the SALES table 130 associated with products that belong to that category.

A row of a table can be uniquely indicated in a join index by primary keys of the table, by a ROWID, by a bit in a bitmap (where the position of the bit corresponds to a rowid), or by other indicators. A primary key is a set of one or more columns defined by a user that provides a unique value for each row in a table. For example, the SALE_ID column, if required to have unique values in each row, can serve as a primary key. A ROWID is a unique number assigned by the DBMS; in some cases the ROWID indicates the physical address of the row on the device where the row is stored. A bitmap is a series of bits in which each bit represents a row for some range of rows in the table. The first bit in the bitmap corresponds to the first row in the range of rows; the second bit corresponds to the second row in the range, etc. One value in each bit indicates that the indexed value is present in the corresponding row, and a different value in the bit indicates the indexed value is not present in the corresponding row. For example, a "1" indicates the indexed value occurs on the corresponding row; and a "0" indicates the indexed value does not occur on the corresponding row.

FIG. 2A and FIG. 2B are block diagrams that illustrate two example bitmap join indexes 210, 220, respectively, for the tables of FIG. 1, according to an embodiment.

Join index 210 uses bitmaps to indicate rows in the SALES table 130 for each value of a state where a store is located as indicated by the STATE column 117. Each index entry includes an indexed value, e.g., a value found in the STATE column 117 of the STORES table 110, and a bitmap indicating rows in the SALES table 130. Three index entries 212*a*, 212*b*, 212*c* are shown in join index 210. Other index entries are indicated by ellipsis 215.

For purposes of illustration, it is assumed that the bitmap corresponds to a range of 8654 rows in the SALES table 130 starting at the row 132*a* having a SALE_ID value of 67890 and ending at the row 132*b* having a SALE_ID value of 76543. The bitmap then includes 8654 bits. In some embodiments, compression techniques are used to compress the bitmap. For example, using compression techniques, the 8654 bits of the illustrated bitmaps might be compressed down to 800 bits. Some compression techniques are especially effective in reducing the size of bitmaps when a large number of sequential bits have the same value. In many cases, bitmaps of rows in a large fact table for a particular value from a dimension table may have long sequences of zeros between non-zero bits. Such long sequences of zeroes compress greatly. In the illustrated embodiment, the join index includes data indicating the base row in the range of rows included in the bitmaps. The base row may be indicated by the primary key or by the ROWID. In some embodiments, the join index also includes data indicating the number of rows in the range.

As shown in FIG. 2A, the join index 210 includes an index entry 212a that has data indicating the indexed value "CA" of the STATE column 117 of the STORES table 110. The index entry 212a also contains a bitmap indicating rows in the SALES table 130. From table 130 in FIG. 1, it can be seen that the first row in the range, corresponding to the first bit, and the last row in the range, corresponding to the last bit, are both sale transactions that occurred at store 1023. From table 110, it can be seen that store 1023 has a value "CA" in the STATE column 117, indicating the store is in California. Thus the index entry 212a has a value of "1" in the first bit and the last bit of the bitmap. For purposes of illustration, it is assumed that the next seven bits of the bitmap have the values shown in index entry 212a. According to the bits shown in the index entry 212a, the sixth row of the SALES table 130 also represents a sale made at a California store (either store 1023 or another California store). The ellipsis in index entry 212a indicates the other 8645 bits of the bitmap.

The join index 210 also includes an index entry 212b that has data indicating the indexed value "MA" of the STATE column 117 of the STORES table 110 for a store located in Massachusetts. The index entry 212b also contains a bitmap indicating rows in the SALES table 130. For purposes of illustration, it is assumed that the first eight bits of the bitmap and the last bit of the bitmap have the values shown in index entry 212b. According to the bits shown in the index entry 212b, the third and fifth rows of the SALES table 130 represent sales made at one or two Massachusetts stores. The ellipsis in index entry 212b indicates the other 8645 bits of the bitmap.

The join index 210 also includes an index entry 212c that has data indicating the indexed value "VA" of the STATE column 117 of the STORES table 110 for a store located in Virginia, such as the store shown in row 112b of FIG. 1. The index entry 212c also contains a bitmap indicating rows in the SALES table 130. For purposes of illustration, it is assumed that the first eight bits of the bitmap and the last bit of the bitmap have the values shown in index entry 212c. According to the bits shown in the index entry 212c, the fourth row of the SALES table 130 represents a sale made at a Virginia store. The ellipsis in index entry 212c indicates the other 8645 bits of the bitmap.

The join index 210 is formed in any manner known at the time the join index is formed. For example, a DBMS command (C1) to form the join index 210 is CREATE BITMAP INDEX bji210
  ON SALES(STORES.STATE) FROM SALES, STORES
    WHERE STORES.STORE_ID=SALES.STORE_ID (C1)

In command C1, command components are indicated in capital italics, and the bitmap join index is named "bji210." The ON component precedes the name of the table (e.g., a fact table) whose rows are listed and, in parentheses, the name of the column holding the indexed values. The column holding the indexed values is in a different table, e.g., a dimension table. The FROM component precedes the names of the tables which are joined to form the join index. The WHERE component precedes the join condition. The join condition states the relationship between rows in the tables on which the join index is based. In the illustrated example, the value in the STORE_ID column of the STORES table 110 equals the value in the STORE_ID column of the SALES table 130 when the value of the STATE column 117 is associated with the row of the SALES table 130. In the embodiment illustrated in FIG. 2A, the join index 210 includes data indicating the index key column (STORES.STATE), the join condition (SALES.STORE_ID=STORES.STORE_ID), the table whose rows are indicated (SALES) and the base row for the bitmap (SALES_ID=67890).

A join is performed to form the join index. After an investment is made once to perform this join, savings are achieved if the same join index can reduce the joining performed to process multiple subsequent queries.

As shown in FIG. 2B, a second join index 220 uses bitmaps to indicate rows in the SALES table 130 for each category indicated by the CATEGORY column 129 in the PRODUCTS table. Each index entry includes an indexed value, e.g., a value found in the CATEGORY column 129 of the PRODUCTS table 120, and a bitmap indicating rows in the SALES table 130. Three index entries 222a, 222b, 222c are shown in join index 220. Other index entries are indicated by ellipsis 225.

The second join index 220 includes an index entry 222a that has data indicating the indexed value "SNACKS" of the CATEGORY column 129 of the PRODUCT table. The index entry 222a also contains a bitmap indicating rows in the SALES table 130. From table 130 in FIG. 1, it can be seen that the first row in the range, corresponding to the first bit, and the last row in the range, corresponding to the last bit, are both sale transactions that sold the same product that has PROD_ID 117. From table 120, it can be seen that product 117 has a value "SNACKS" in the CATEGORY column 129. Thus the index entry 222a has a value of "1" in the first bit and the last bit of the bitmap. For purposes of illustration, it is assumed that the next seven bits of the bitmap have the values shown in index entry 222a. According to the bits shown in the index entry 222a, the fifth and sixth rows of the SALES table 130 also represent sales of a snack (either product 117 or some other snack product). The ellipsis in index entry 222a indicates the other 8645 bits of the bitmap.

The join index 220 also includes an index entry 222b that has data indicating the indexed value "CANDY" of the CATEGORY column 129 of the PRODUCT table. The index entry 222b also contains a bitmap indicating rows in the SALES table 130. For purposes of illustration, it is assumed that the first eight bits of the bitmap and the last bit of the bitmap have the values shown in index entry 222b. According to the bits shown in the index entry 212b, the second and third rows of the SALES table 130 represent sales of products in the candy category. The ellipsis in index entry 222b indicates the other 8645 bits of the bitmap.

The join index 220 also includes an index entry 222c that has data indicating the indexed value "SANDWICHES" of the CATEGORY column 129 of the PRODUCTS table. The index entry 222c also contains a bitmap indicating rows in the SALES table 130. For purposes of illustration, it is assumed that the first eight bits of the bitmap and the last bit of the bitmap have the values shown in index entry 222c. According to the bits shown in the index entry 222c, the fourth, seventh and eighth rows of the SALES table 130 represent sales of sandwiches. The ellipsis in index entry 222c indicates the other 8645 bits of the bitmap.

The join index 220 is formed in any manner known at the time the join index is formed. For example, a DBMS command (C2) to form the join index 220 is CREATE BITMAP INDEX bji220
      ON SALES(PRODUCTS.CATEGORY) FROM SALES, PRODUCTS
      WHERE PRODUCTS.PROD_ID=SALES.PROD_ID (C2)

In command C2, the bitmap join index is named "bji220." The join condition in the illustrated embodiment is that the value in the PROD_ID column of the PRODUCTS table equals the value in the PROD_ID column of the SALES table 130 when the value of the CATEGORY column 129 is associated with the row of the SALES table 130. In the embodiment illustrated in FIG. 2B, the join index 220 includes data indicating the index key column (PRODUCTS.CATEGORY), the join condition (SALES.PROD_ID=PRODUCTS.PROD_ID), the table whose rows are indicated (SALES), and the base row for the bitmap (SALES_ID=67890).

EXAMPLE CONVENTIONAL PROCESSING

It is assumed for purposes of illustration that a first SQL query (Q1) of the following form is processed:

SELECT SUM(SALES.PRICE)
    FROM SALES, PRODUCTS
    WHERE PRODUCTS .PROD_ID=SALES.PROD_ID
      AND PRODUCTS.CATEGORY="SNACKS" (Q1)

The query indicates a join because data is selected from two tables listed after the FROM component, the SALES table 130 and the PRODUCTS table 120. The query Q1 indicates that the sum of the sales price should be computed for all sales involving snacks. Using conventional processing, the join index 220 is used to determine which rows of the SALES table 130 to join with the PRODUCTS table during a select operation. For example, the index entry 222a is used to determine that the first row, the fifth row, sixth row, and last row of the SALES table 130 satisfy the query condition that the products sold are in the snacks category. Other rows of the SALES table 130 might be indicated by bits having the value "1" among the bits represented by the ellipsis in index entry 222a. The first, fifth, sixth and last rows of the SALES table 130, and any other rows indicated, are then joined back to the products table, and the processing of the query continues. Using the method of FIG. 6A and subsequent flowcharts, the join operation can be avoided altogether.

It is assumed for purposes of illustration that a second SQL query (Q2) of the following form is also processed:

SELECT SUM(SALES.PRICE)
    FROM SALES, PRODUCTS, STORES
    WHERE PRODUCTS.PROD_ID=SALES.PROD_ID
      AND (PRODUCTS.CATEGORY="SNACKS" OR PRODUCTS.CATEGORY="SANDWICHES")
      AND STORES.STORE_ID=SALES.STORE_ID
      AND STORES.STATE="MA" (Q2)

The query Q2 indicates a join because data is selected from three tables listed after the FROM component, the SALES table 130, the PRODUCTS table, and the STORES table 110. The query Q2 indicates that the sum of the sales price should be computed for all sales in Massachusetts involving either snacks or sandwiches. The WHERE component of query Q2 includes a constraint on the STORES table 110, "STORES.STATE="MA," and a constraint on the PRODUCTS table, "PRODUCTS.CATEGORY="SNACKS" OR PRODUCTS.CATEGORY="SANDWICHES." The WHERE component of query Q2 also includes two join conditions for the two dimension tables.

Using conventional processing, the join indexes 210, 220 are used to determine which rows of the SALES table 130 to join with the PRODUCTS table and the STORES table 110 during multiple select operations. For example, a logical OR operation is performed on the bitmap from index entry 222a and the bitmap from index entry 222c to determine the SALES table 130 rows that involve either snacks or sandwiches. Table 1 shows the result of the logical OR operation.

TABLE 1

Logical OR of example join index bitmaps to determine rows that include either snacks or sandwiches.

| Source | Bitmap |
| --- | --- |
| Index entry 222a (for "SNACKS") | 10001100 . . . 1 |
| Index entry 222c (for "SANDWICHES") | 00010011 . . . 0 |
| Result of OR operation | 10011111 . . . 1 |

The result indicates that the first, fourth, fifth, sixth, seventh, eighth and last row of the SALES table 130 satisfy the query condition that the products sold are in the snacks or sandwiches category. Other rows of the SALES table 130 might be indicated by bits having the value "1" among the bits represented by the ellipsis in index entries 222a and 222c. In embodiments using lists of ROWIDs instead of bitmaps in the join indexes, the union of the lists of ROWIDs is determined to represent the rows to be retrieved from the fact table.

An operation analogous to the bitwise OR for bitmaps and the union for the lists of ROWIDs is performed if the query includes a WHERE clause involving a range predicate, such as <,>,>=,<=, LIKE, BETWEEN, or if the query does not provide a predicate for a key column of a multicolumn index key.

A logical AND operation is performed on the resultant bitmap from Table 1 and index entry 212b to determine the SALES table 130 rows that involve either snacks or sandwiches and stores in Massachusetts. Table 2 shows the result of the logical AND operation.

TABLE 2

Logical AND of example bitmaps to determine rows that include either snacks or sandwiches sold in Massachusetts.

| Source | Bitmap |
| --- | --- |
| Result of OR operation | 10011111 . . . 1 |
| Index entry 212b (for "MA") | 00101000 . . . 0 |
| Result of AND operation | 00001000 . . . 0 |

The result indicates that the fifth row of the SALES table 130 satisfies the query condition that the products sold in the snacks or sandwiches category are in Massachusetts. Other rows of the SALES table 130 might be indicated by bits having the value "1" among the bits represented by the ellipsis in the last line of Table 2. The fifth row of the SALES table 130, and any other rows indicated, is then joined back to the PRODUCTS table, and the result is then joined to the STORES table 110, and the processing of the query continues. In embodiments using lists of ROWIDs instead of bitmaps in the join indexes, the intersection of the lists of ROWIDs is determined to represent the rows to be retrieved from the fact table.

Characteristics of execution algorithms that use index entries to access the tables can affect whether join operations can be eliminated. Those characteristics are described here.

An execution algorithm has the characteristic of "preserving associations" between the index key values and rows of the fact table if it is possible to tell, for each ROWID in the list or each bit in the bitmap, what key values of the index or indexes were originally associated with that ROWID or bit. An example of an execution algorithm that preserves associations is a range scan of a single index. Each key value is returned with a list of ROWIDs or a bitmap, and the value of the index key is known at the time the row is accessed. An example of an execution algorithm that does not preserve associations is a bitmap generated by a bitwise OR of several bitmaps corresponding to index entries from different indexes, such as the third bitmap in Table 1. There is no indication of the index key value "SNACKS" or "SANDWICHES" that caused a particular bit to be set to "1." Although the index key value information can be kept, such as with a data structure described below with reference to FIG. 5, this is not done conventionally because doing so reduces the efficiency of the bitwise operation.

An execution algorithm has the characteristic of being "exact" if the list of ROWIDS or the bitmap indicates every row that satisfies the conditions on the columns from a dimension table and no other rows. An example of an execution operation that is exact is a bitwise AND of bitmaps, such as the third bitmap of Table 2. Every row satisfying the condition of "SNACKS" or "SANDWICHES" in the state "MA," and no other row, is indicated in the bitmap. An example of an execution operation that is not exact is an execution operation that maps ROWIDs to bits in a bitmap using a hash function, for determining an intersection of multiple lists of ROWIDs. The resulting bitmaps are subjected to a bitwise AND. A row from the fact table is then accessed if a ROWID in one of the lists hashes to a bit with a value of "1." Because of collisions, more than one ROWID may be mapped to the same bit. Thus a ROWID that hashes to a bit set to "1" might be a ROWID of a row that is not in the intersection—an excess row. Such an execution algorithm is not exact.

METHOD FOR AVOIDING JOINS

FIG. 6A is a flowchart illustrating at a high level a method for determining whether joins can be avoided while processing a query involving columns from multiple tables of a database using one or more join indexes, according to an embodiment. Although steps are shown in FIG. 6A and other flowcharts in a particular order, in other embodiments the steps can be performed in a different order or overlapping in time. For example, in this embodiment, many steps of FIG. 6A are performed when an execution plan is formed for executing the query, before the query is actually executed. In other embodiments, one or more of such steps are performed during the execution of the query.

In step 610, a query is received involving columns from multiple dimensions. For example query Q2 is received. As used herein a dimension is made up of one or more tables that provide further information for values in a column of the fact table. In the example of the star schema given in FIG. 1, each dimension has only one table. In a snowflake schema, each dimension may include multiple tables. For example, if the name in the manager column 119 were a primary key into a MANAGER table giving more information about the manager, the stores dimensions would include both the STORES table 110 and the MANAGER table. For simplicity, the examples used herein include only a single table in each dimension.

In step 620, eligible join indexes are determined from a set of one or more join indexes for the fact table. In order for a join index to be eligible, each join condition in the definition of the join index must occur in the WHERE clause of the query. For example, join indexes bji210 and bji220 are eligible join indexes for query Q2 because the join conditions of bji210 and bji220, given above in commands C1 and C2, respectively, are included in the WHERE clause of query Q2.

In step 624, the most cost effective index or indexes to use are determined using any known method for estimating costs during optimization of an execution plan. During step 624, it is also determined whether predicates in the WHERE clause of the query cause the execution algorithm to access the join indexes as an index key or as a filter of index entries after the index entries have been accessed. For example, the optimizer determines that query Q2 should cause the execution algorithm to access index bji210 using the value of "MA" as an index key, and to access index bji220 using the values of "SNACKS" and "SANDWICHES" as index keys. An example of a predicate used as a filter of index entries already retrieved, is a join index that uses three columns (col1, col2, col3) as an index key and a query that includes in its WHERE clause predicates on col1, and col3 but not on col2. The predicate on col1 is used as an index key to retrieve entries from the join index, and the predicate on col3 is used to filter the entries retrieved.

In step 626, the next dimension of multiple dimensions is selected as the current dimension. If the fact table has only one dimension, the one dimension is selected as the current dimension.

In step 630, it is determined whether a join to the current dimension can be avoided. More details for an embodiment of step 630 are given below with reference to FIG. 6B.

If a join can be avoided, control passes to step 670 to develop an execution plan without allocating a join to the current dimension table. If a join cannot be avoided, control passes to step 680 to allocate the join to the current dimension as part of the execution plan.

Control then passes to step 690 to determine whether another dimension should be considered. If so, control passes to step 626 to make the next dimension the current dimension. If no other dimension remain to be considered, control passes to step 692 to execute the execution plan, avoiding joins for the certain dimensions made part of the plan in step 670.

METHOD FOR DETERMINING WHETHER TO AVOID JOINS

Figure 6B:
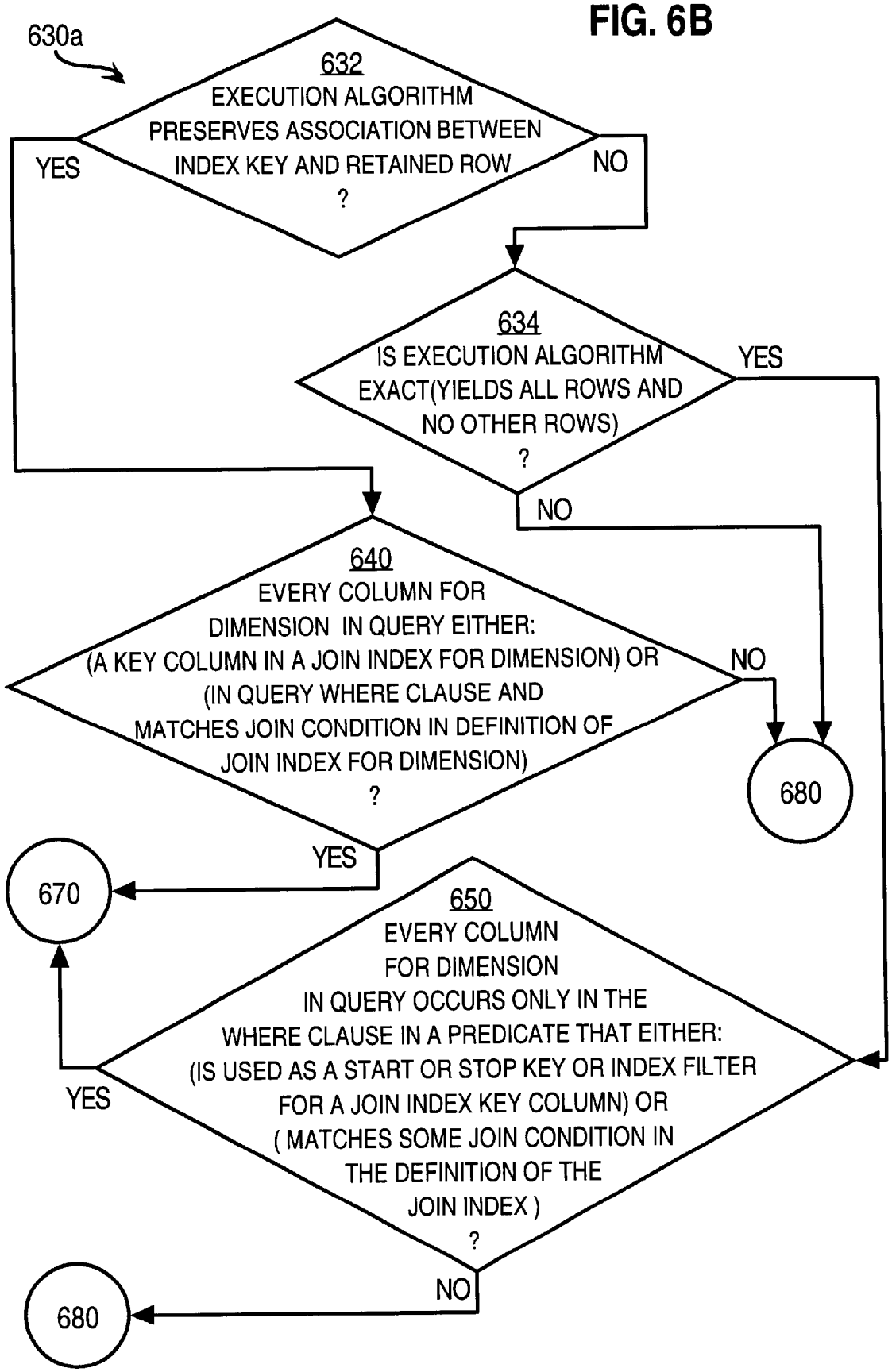
FIG. 6B is a flowchart illustrating in more detail an embodiment of a step in FIG. 6A.

FIG. 6B is a flowchart illustrating an embodiment 630*a* of step 630 of the method for avoiding joins while processing a query involving columns from multiple tables of a database using one or more join indexes. Embodiment 630*a* is a method for determining whether to avoid joins for a dimension in a plan for execution of the query. In other embodiments, the steps of FIG. 6B may be employed to determine whether to avoid joins during actual execution of the query.

In step 632, it is determined whether the execution algorithm preserves associations between join index key values and rows in the fact table. If not, then control passes to step 634. If the execution algorithm preserves associations, then control passes to step 640 to determine if joins can be eliminated for the current dimension. For example, for query Q1, which includes only one dimension table, associations are preserved and control passes to step 640. However, for query Q2, which includes an "OR," associations are often not preserved by conventional execution algorithms. If associations are not preserved, control passes to step 634 while processing query Q2. If associations are preserved, such as with a data structure described below with reference to FIG. 5, control passes to step 640 while processing query Q2. For purposes of illustration, it is assumed that control passes to step 634 while processing query Q2.

When control passes to step 634, associations are not preserved, and joins can be eliminated only in some more restrictive circumstances in which the execution algorithm is exact, as described below. If the execution algorithm is not exact, then the joins cannot safely be avoided without risk of including too many rows (or not enough rows). Therefore, in step 634, it is determined whether the execution algorithm is exact. If not, control passes to step 680 to allocate for joins in the current dimension. If the execution algorithm is exact, control passes to step 650 to determine if joins for the current dimension can be eliminated.

In some embodiments steps 632 and 634 are performed before step 626. If the execution algorithm neither preserves associations nor is exact, no dimension should avoid a join and control should pass to step 680 for every dimension.

If it is determined in step 632 that the execution algorithm preserves associations, control passes to step 640 to determine circumstances in which joins can be eliminated. If joins can be eliminated, control passes to step 670; if not control passes to step 680. Joins for the dimension can be eliminated if every column for the current dimension that is referenced in the query is either a join index key column or satisfies certain additional conditions. If the column is an index key column, then a value can be associated with the column from the join index, and the column can appear anywhere in the query, including in the SELECT clause. If the column is not a join index key column, then joins can still be avoided if the column appears only in the WHERE clause with a predicate that matches the join condition in the definition of the join index.

For example, while processing query Q1, the columns from the products dimension are PRODUCTS.CATEGORY and PRODUCTS.PROD_ID of the PRODUCTS table. PRODUCTS.CATEGORY is an index key of join index bji220, so this column can appear anywhere in the query without requiring a join. PRODUCTS.PROD_ID is not an index key, so it can only appear in the WHERE clause as a predicate that matches the join condition in the definition of join index bji220 if a join is to be avoided for this dimension. In the example, the PRODUCTS.PROD_ID column appears only in the WHERE clause and only in a predicate that matches the join condition in the definition of the join index. Both are:

"PRODUCTS.PROD_ID=SALES.PROD_ID."

Therefore query Q1 can be processed without a join to the PRODUCTS table, and control passes to step 670.

As described above, control passes to step 634 when it is determined in step 632 that associations are not preserved. If it is determined in step 634 that the execution algorithm is exact, control passes to step 650 to determine circumstances in which joins can be eliminated. If joins can be eliminated, control passes to step 670; if not control passes to step 680. Joins for the current dimension can be eliminated if every reference to a column of the dimension occurs only in the WHERE clause of the query and satisfies a certain additional condition. The additional condition is that, if the column is an index key column, then the column reference is in a predicate that is used as a start or stop key column to position the traversal of the index or as an index filter. Values from the key column are not needed after the join index is accessed and filtered, thus a preserved association is not needed. If the column is not a join index key column, then the column appears only in a predicate in the WHERE clause that matches some join condition in the definition of the index.

For example, while processing query Q2, the columns from the store dimension are STORES.STATE and STORES.STORE_ID. STORES.STATE is an index key column of join index bji210 so it can appear in the WHERE clause in a predicate that is used as an index start or stop key or as a filter. STORES.STATE does appear in the WHERE clause of query Q2 as "STORES.STATE="MA." As described above, this use of STORES.STATE is as an index key for retrieving rows from the join index. STORES.STORE_ID is not an index key, so it can only appear in the WHERE clause as a predicate that matches the join condition in the definition of join index bji210 if a join is to be avoided for this dimension. In the example, the STORES.STORE_ID column appears only in the WHERE clause and only in a predicate that matches the join condition in the definition of the join index. Both are:

"STORES.STORE_ID=SALES.STORE_ID."

Therefore query Q2 can be processed without a join to the PRODUCTS table; and control passes to step 670.

ANOTHER EMBODIMENT INVOLVING ONE DIMENSION TABLE

FIG. 3A is a flowchart illustrating at a high level a method for determining whether joins can be avoided while processing a query involving columns from two tables of a database using one join index, according to another embodiment.

In step 310, a query is received that involves columns from two tables; such queries preserve associations. For example, the query given by Q1, above, is received.

In step 320, information about a join index for the two tables is obtained, for example from a join index definition in a data dictionary for the database. For example, information is retrieved about the join index 220 for the two tables SALES and PRODUCTS. The table whose rows are indicated in the join index is hereinafter called the "fact table," and the other table is called the "dimension table."

In step 330, it is determined whether a join operation can be avoided based on the query and the information about the join index. For example, since all of the columns involved in the query Q1 are described in either the SALES table 130 itself or the join index 220, the join operation can be avoided. The columns involved in the query Q1 include the SALES.PRICE column, the SALES.PROD_ID column, the PRODUCTS.PROD_ID column, and the PRODUCTS.CATEGORY column 129 that are provided in the SALES table 130 or the join index 220. An embodiment of step 330 is described in more detail below with reference to FIG. 3B.

If it is determined in step 330 that the join operation cannot be avoided, control passes to step 380 to allocate a join, or to otherwise perform the join, as in the conventional method.

If it is determined in step 330 that the join operation can be avoided, control passes to step 370 to process the query using information in one table and the join index, without allocating the join. For example, it is determined in step 330 that the join operation can be avoided for query Q1; and control passes to step 370 to execute or form an execution plan for query Q1 using information in the SALES table 130 and the join index 220, without joining back the PRODUCTS table.

Figure 3B:
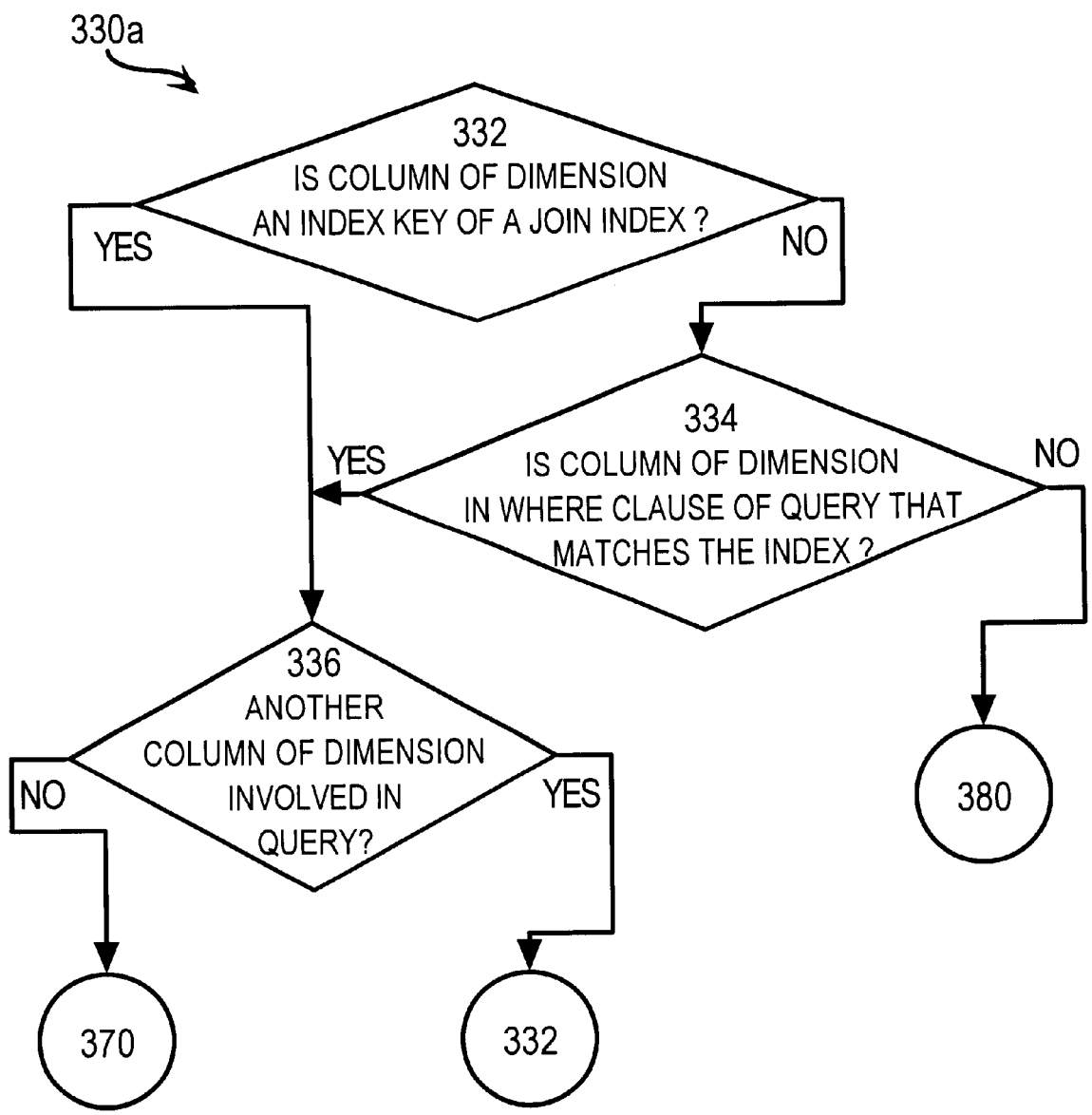
FIG. 3B is a flowchart illustrating in more detail an embodiment of a step in FIG. 3A.

FIG. 3B is a flowchart illustrating in more detail an embodiment 330a of step 330 in FIG. 3A.

In step 332 it is determined whether a column of the dimension table included in the query is an index key of a join index that indicates rows of the fact table. If more than one join index indicates rows in the fact table based on index keys that are columns in the dimension table, then all such join indexes are checked until an eligible one is found that uses the column as an index key. Data in columns of the fact table are not checked because such data is available directly from the fact table and does not require a join to obtain. If the column of the dimension table is an index key of a join index, then the information from those column for processing the query is in a join index; and the join operation can be avoided; and control passes to step 336, to determine if there is another column of the dimension table included in the query.

If it is determined in step 332 that a particular column of the dimension table is not an index key for a join index that indicates rows of the fact table, then control passes to step 334.

In step 334, it is determined whether the particular column of the dimension table appears only in a WHERE component of the query that matches the join condition of the join index. The WHERE component of the query is considered to match the join index if the join condition in the WHERE component is the same as the join condition used to form the index or if the particular column in the WHERE component is an index key of the join index, or both. If so, then the condition involving the particular column to be evaluated for the query is automatically satisfied by the rows indicated by the join index and the condition need not be evaluated again by performing a join. Control passes to step 336 to avoid the join operation.

If it is determined in step 334 that the particular column is not in a WHERE component that matches a join index, then the join operation should not be avoided. Control then passes to step 380, shown in FIG. 3A, to allocate the join for processing the query.

In step 336, it is determined whether another column of the dimension table appears in the query. If so, control passes back to step 332. If not, then no column of the dimension table relies on the join operation; and control passes to step 370, shown in FIG. 3A, to process the query without allocating a join for the dimension table.

For example, query Q1 has two columns from the PRODUCTS table. The PRODUCTS table is the dimension table that might be joined to the SALES table 130, which is the fact table. The two columns from the dimension table are the PRODUCTS.PROD_ID column and the PRODUCTS.CATEGORY column 129. In step 332, it is determined that the PRODUCTS.PROD_ID column is not an index key of the join index 220; and control passes to step 334. In step 334 it is determined that the PRODUCTS.PROD_ID column appears only in a WHERE component "SALES.PROD_ID=PRODUCTS.PROD_ID" that matches the join condition of the join index 220. Control then passes to step 336 to determine if another column of the dimension table is involved in the query.

It is determined in step 336 that another column of the dimension table is the PRODUCTS.CATEGORY column 129; and control passes to step 332 to act on the PRODUCTS.CATEGORY column 129. In step 332 it is determined that the PRODUCTS.CATEGORY column 129 is an index key of the join index 220. Therefore, control passes to step 336. In step 336 it is determined whether another column of the dimension table is involved. Since no other columns of the dimension table are involved in the query, control passes to step 370, to process the query without allocating the join.

Using the method of FIG. 3A and FIG. 3B, a query that appears to call for a join operation, such as query Q1, is processed without performing the join operation. The query is therefore processed in a manner that is generally more efficient, consuming fewer resources than consumed when performing a join operation.

ANOTHER EMBODIMENT INVOLVING MULTIPLE DIMENSION TABLES

Figure 4A:
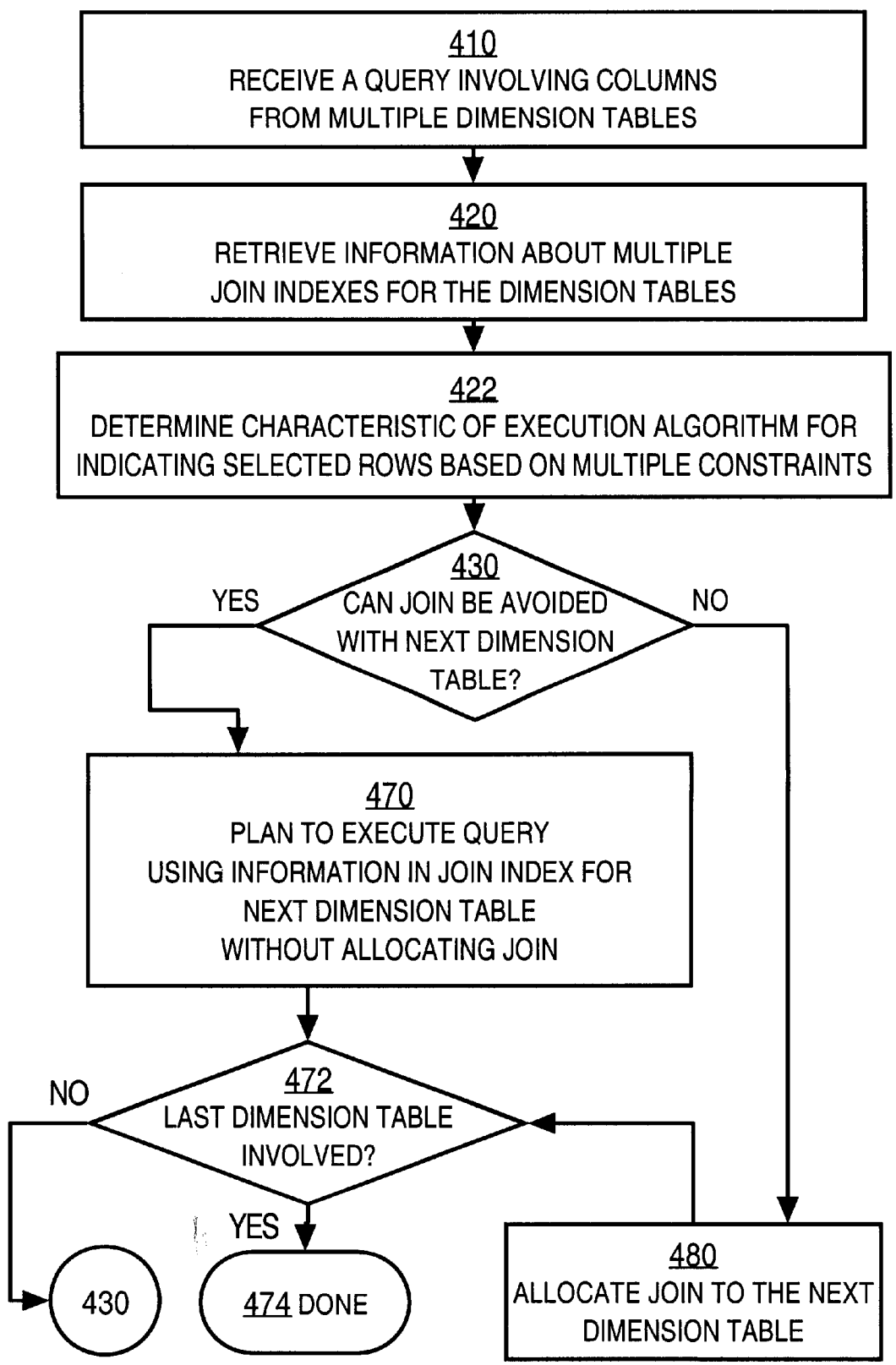
FIG. 4A is a flowchart illustrating at a high level a method for avoiding joins while processing a query involving columns from a fact table and two or more dimension tables of a database using multiple join indexes, according to an embodiment.

FIG. 4A is a flowchart illustrating at a high level a method for avoiding joins while processing a query involving columns from a fact table and two or more dimension tables of a database using multiple join indexes, according to an embodiment. It is assumed for purposes of illustration that query Q2 is processed.

Using the method of FIG. 4A, the join operation can be avoided altogether. In step 410, a query is received that involves columns from three or more tables. For example, the query given by Q2, above, is received.

In step 420, information is retrieved about multiple join indexes for the three or more tables. For example, information is retrieved from a data dictionary defining the join index 210 for the two tables SALES and STORES, and defining the join index 220 for the two tables SALES and PRODUCTS. Thus information is retrieved about join indexes involving the three tables SALES, STORES, and PRODUCTS. The table whose rows are indicated in the join index is hereinafter called the "fact table," and the other tables are called, in turn, the "dimension table."

In step 422, characteristics of the execution algorithm are determined. For example, it is determined whether the execution algorithm preserves associations between rows of the fact table and indexed values of the join index. For example, some or all the rows in Table 1 or Table 2 or both are stored in a data structure by the execution algorithm. In other embodiments, other data indicating rows that satisfy the constraints are included in the data structure. For example, a first bitmap indicating rows for snacks sold in Massachusetts and a second bitmap indicating rows for sandwiches sold in Massachusetts are stored in the data structure.

FIG. 5 is a block diagram that illustrates an example data structure that stores results of an AND operation on entries from two join indexes, according to an embodiment. Entry 512a includes a bitmap for snacks in Massachusetts formed by performing a logical AND on the bitmap in index entry 222a from join index 220 and the bitmap in index entry 212b from join index 210. In addition, entry 512a includes "SNACKS . . . MA" indicating the index key values associated with the bitmap. In other embodiments, only the bitmap is included in the entry 512a. Entry 512b includes a bitmap for sandwiches in Massachusetts formed by performing a logical AND on the bitmap in index entry 222c from join index 220 and the bitmap in index entry 212b from join index 210. In addition, entry 512b includes "SANDWICHES . . . MA" indicating the index key values associated with the bitmap. In other embodiments, only the bitmap is included in the entry 512b. The execution algorithm that keeps the labels "SNACKS . . . MA" and "SANDWICHES . . . MA" preserve associations between index keys and individual rows in the bitmap.

In step 430, it is determined whether a join operation with one of the dimension tables can be avoided based on the query and the information in the data structure. An embodiment of step 430 is described in more detail below with reference to FIG. 4B.

If it is determined in step 430 that the join operation with one of the dimension tables cannot be avoided, control passes to step 480 to allocate the join in the plan or to perform the join operation with the dimensional table as in the conventional method. Control then passes to step 472, described below, to determine whether another dimension table is involved.

If it is determined in step 430 that the join operation for one of the dimension tables can be avoided, control passes to step 470 to plan or execute the query using information in one table and the data structure, without allocating the join or performing the join operation for the one dimension table. For example, it is determined in step 430 that the join operation can be avoided for query Q2, and control passes to step 370 to form an execution plan for query Q2 using information in the SALES table 130 and the data structure 510, without joining back the STORES table 110. Control then passes to step 472.

In step 472 it is determined whether the last dimension table involved in the query has been considered. If not, control passes back to step 430 to consider the next dimension table involved in the query. If it is determined in step 472 that the last dimension table involved in the query has been considered, join decisions for processing of the query are completed as indicated by passing control to step 474.

Figure 4B:
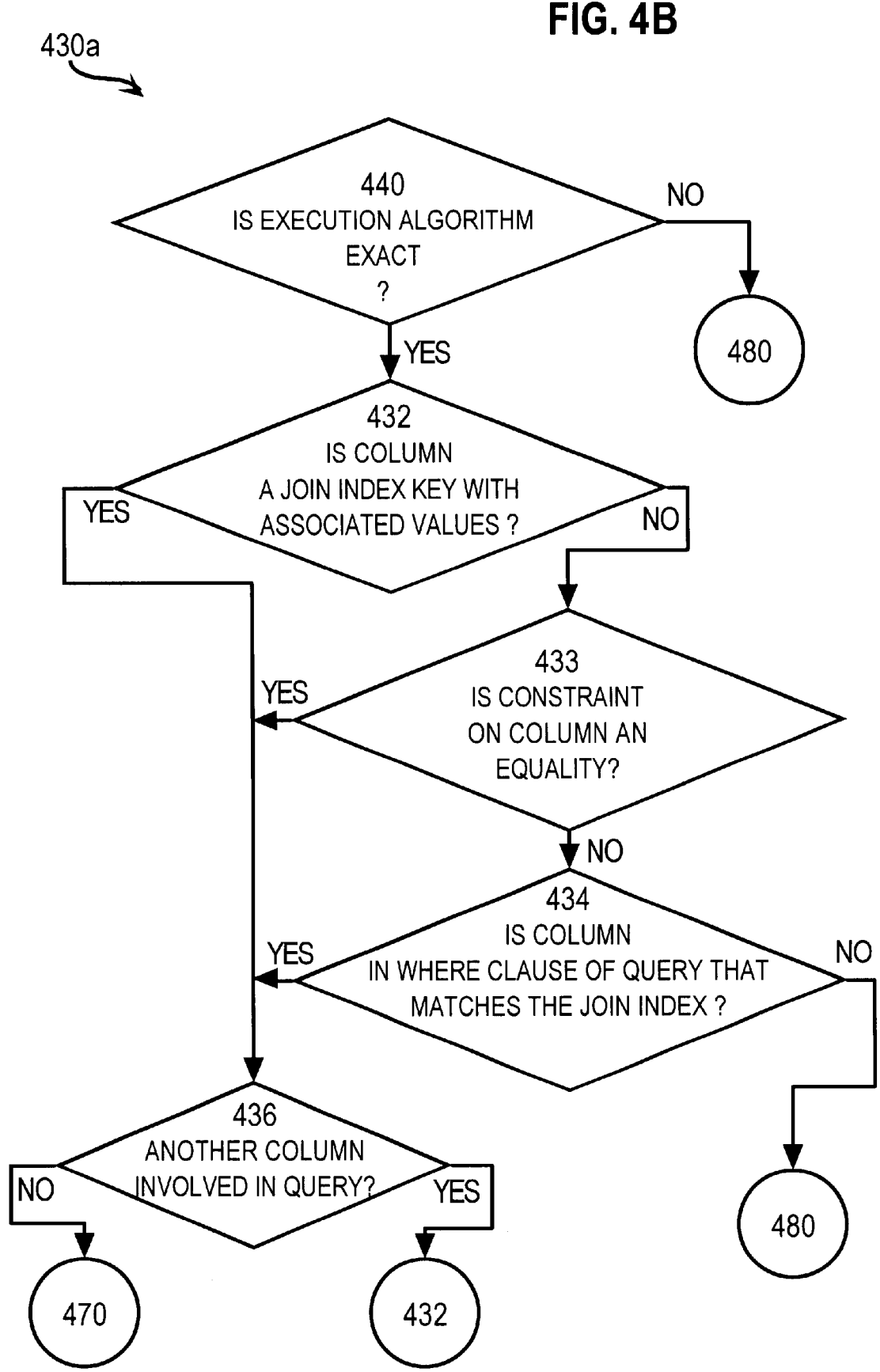
FIG. 4B is a flowchart illustrating in more detail an embodiment of a step in FIG. 4A.

FIG. 4B is a flowchart illustrating in more detail an embodiment 430a of step 430 in FIG. 4A. During step 430a, it is determined whether a join can be avoided for a particular dimension table of the multiple dimension tables.

In step 440, it is determined whether the execution algorithm is exact, e.g., whether the data structure indicates all rows that satisfy the constraints and no other rows. When a bitmap is used to indicate rows in the fact table, then evaluating logical AND or logical OR operations or both are exact—indicating all the rows that satisfy the constraints and no other rows. When a hash function is used to form a bitmap, as described above, the logical AND performed as part of step 422 is not exact and may produces a bitmap that indicates at least the ROWIDs of the result of the AND, but may include additional ROWIDs. The extra ROWIDs are winnowed out during a subsequent join. Thus, if the result of the logical AND or logical OR yields too many rows, the join operation should still be performed and the join allocation should not be eliminated. When the result yields too many rows, control passes to step 480 shown in FIG. 4A, to allocate the join.

In step 432 it is determined whether a column of the particular dimension table included in the query is an index key stored in the data structure with the resultant data indicating the rows of the fact table, such as the resultant bitmap. If the column of the dimension table is an index key in the data structure, then the information from that column for processing the query is in the data structure; and the join operation can be avoided. If the join operation is to be avoided, control passes to step 436, to determine if there is another column of the particular table included in the query.

If it is determined in step 432 that a particular column of the particular table is not an index key stored in the data structure, then control passes to step 433.

In step 433, it is determined whether the column is an index key column that is constrained to satisfy an equality, such that only a single value satisfies the constraint. If so, then the value for the column is known from the equality and the column can appear in non-conditional components of the query such as the SELECT component or a GROUP component, where the value is utilized. If not, the value of the column that satisfies the constraint is not known, because any of several values could satisfy the constraint. The row is known to satisfy the constraint, but the value of the column is not known. The column cannot appear outside the WHERE clause of the query (such as the SELECT component or a GROUP component) if the join is to be avoided, even though the column is an index key column. The column cannot appear in any component of the query except in a WHERE component of the query that matches the join index, as described next with respect to step 434.

In step 434, it is determined whether the particular column of the particular table appears only in a WHERE component of the query that matches the join index. The WHERE component of the query is considered to match the join index if the join condition in the WHERE component is the same as the join condition used to form the index or if the particular column is an index key of the join index, or both. If so, then the condition involving the particular column to be evaluated for the query is automatically satisfied by the rows determined using the join index; and no values need be obtained from the dimension table itself. The join can be avoided and control passes to step 436.

If it is determined in step 434 that the particular column is not in a WHERE component that matches a join index, then the join operation should not be avoided. Control then passes to step 480, shown in FIG. 4A, to allocate the join and perform the join while executing the query.

In step 436, it is determined whether another column of the particular table appears in the query. If so, control passes back to step 432. If not, then no column of the dimension table relies on the join operation; and control passes to step 470, shown in FIG. 3A, to plan or execute the query without allocating a join operation with the dimension table.

For example, query Q2 refers to two dimension tables, a STORES table 110 and a PRODUCTS table. It is assumed for purposes of illustration that method 430a is first performed on the STORES table 110 and then on the PRODUCTS table for an execution algorithm that forms the data structure illustrated in FIG. 5, which preserves association between rows of the fact table and values of the join index key.

In step 440, it is determined that the execution algorithm uses data structure 510, which indicates all rows that satisfy the constraints and no other rows, because the data structure 510 uses exact bitmaps and not bitmaps based on a had function. Control passes to step 432. The query Q2 has two columns from the STORES table 110, the current dimension table. The two columns from the current dimension table are the STORES.STORE_ID column and the STORES.STATE column 117. In step 432, it is determined that the STORES.STORE_ID column is not an index key in the join index 210; and control passes to step 433. In step 433, it is determined the STORES.STORE_ID is not in a constraint but is rather in the join condition. Control passes to step 434. In step 434 it is determined that the STORES.STORE_ID column appears only in a join condition "SALES.STORE_ID=STORES.STORE_ID" that matches the join condition of the join index 210. Control then passes to step 436 to determine if another column of the STORES table 110 is involved in the query.

It is determined in step 436 that another column of the STORES table 110 is the STORES.STATE column 117; and control passes to step 432 to act on the STORES.STATE column 117. In step 432 it is determined that the STORES.STATE column 117 is an index key of the join index 210, which has values in the data structure 510 because the STORES.STATE value "MA" is in entries 512a and 512b. Therefore, control passes to step 436. In step 436 it is determined whether another column of the STORES table 110 is involved. Since no other columns of the STORES table 110 are involved in the query, control passes to step 470, to process the query without allocating the join for the STORES table 110.

In step 472 it is determined that STORES table 110 is not the last dimension table involved in the query Q2, but that the PRODUCTS table is also involved. Control passes back to step 430 as implemented in embodiment 430a.

In step 440 it is determined that the execution algorithm uses data structure 510, which indicates all rows that satisfy the constraints and no other rows. Control passes to step 432.

The query Q2 has two columns from the PRODUCTS table, the current dimension table. The two columns from the current dimension table are the PRODUCTS.PROD_ID column and the PRODUCTS.CATEGORY column 129. In step 432, it is determined that the PRODUCTS.PROD_ID column is not an index key in the data structure 510; and control passes to step 433. In step 433, it is determined that the PRODUCTS.PROD_ID is not in a constraint but is rather in the join condition. Control passes to step 434. In step 434 it is determined that the PRODUCTS.PROD_ID column appears only in a join condition "SALES.PROD_ID=PRODUCTS.PROD_ID" that matches the join condition of the join index 220. Control then passes to step 436 to determine if another column of the PRODUCTS table is involved in the query.

It is determined in step 436 that another column of the PRODUCTS table is the PRODUCTS.CATEGORY column 129; and control passes to step 432 to act on the PRODUCTS.CATEGORY column 129. In step 432 it is determined that the PRODUCTS.CATEGORY column 129 is an index key, which has values preserved in the data structure 510 (PRODUCTS.CATEGORY values "SNACKS" and "SANDWICHES" are in entries 512a and 512b, respectively). Therefore, control passes to step 436. In step 436 it is determined whether another column of the PRODUCTS table is involved. Since no other columns of the PRODUCTS table are involved in the query, control passes to step 470, to process the query without allocating the join for the STORES table 110.

In step 472 it is determined that the PRODUCTS table is the last dimension table involved in the query Q2. Control passes back to step 474 indicating that processing of the query by the method of FIG. 4A is complete.

In another embodiment, the execution algorithm does not preserve associations because it uses a data structure herein called the "bitmap-only data structure." The data structure 510 includes the bitmaps but omits the values of the index keys. For example the values "MA" "SNACKS" and "SANDWICHES" are omitted from entries 512a and 512b. In another example, the data structure includes only the resultant bitmap, such as the third line of Table 2, shown above. In this bitmap-only data structure embodiment, step 432 does not find values of index keys in the data structure and control always passes to step 433.

For example, when the column is the STORES.STATE column 117, control passes to step 433 to determine if the constraint is an equality evaluated with the join index. The STORES.STATE column 117 is evaluated using the join index and appears in query Q2 as an equality constraint, i.e., "STORES.STATE=MA." Therefore control passes to step 436. The join operation can be avoided because it is known that any row in the resultant set of rows determined from the join index has a STORES.STATE value of "MA." The STORES.STATE column 117 may appear anywhere in the query, such as after the SELECT component, because the value for STORES.STATE is known to be "MA."

However, when the column is the PRODUCTS.CATEGORY column 129, control passes to step 433 to determine if the constraint is an equality evaluated with the join index. The PRODUCTS.CATEGORY column 129 does not appear in query Q2 as an equality constraint, because PRODUCTS.CATEGORY can have more than one value, either a value of "SNACKS" or a value of "SANDWICHES." The PRODUCTS.CATEGORY column 129 may not appear outside the WHERE component of the query, such as after the SELECT component, because the value for PRODUCTS.CATEGORY column 129 is unknown. The join operation should not be avoided if the PRODUCTS.CATEGORY column 129 appears outside the WHERE component because it is not known whether any row in the resultant set of rows has a PRODUCTS.CATEGORY value of "SNACKS" or "SANDWICHES."

Control passes to step 434 to determine if the PRODUCTS.CATEGORY column 129 is in a WHERE component that matches the index. In this example, the PRODUCTS.CATEGORY column 129 appears only in the WHERE component of the query and is an index key of the join index, therefore the join can still be avoided and control passes to step 436. The join can be avoided because the set of rows in the data structure are based on a join index that can evaluate the WHERE component, because the WHERE component is based on an index key column of the join index.

Using the method of FIG. 4A and FIG. 4B, a query that appears to call for a join operation, such as query Q2, is processed without performing the join operation. The query is therefore processed in a manner that is generally more efficient, consuming fewer resources than consumed when performing a join operation.

HARDWARE OVERVIEW

Figure 7:
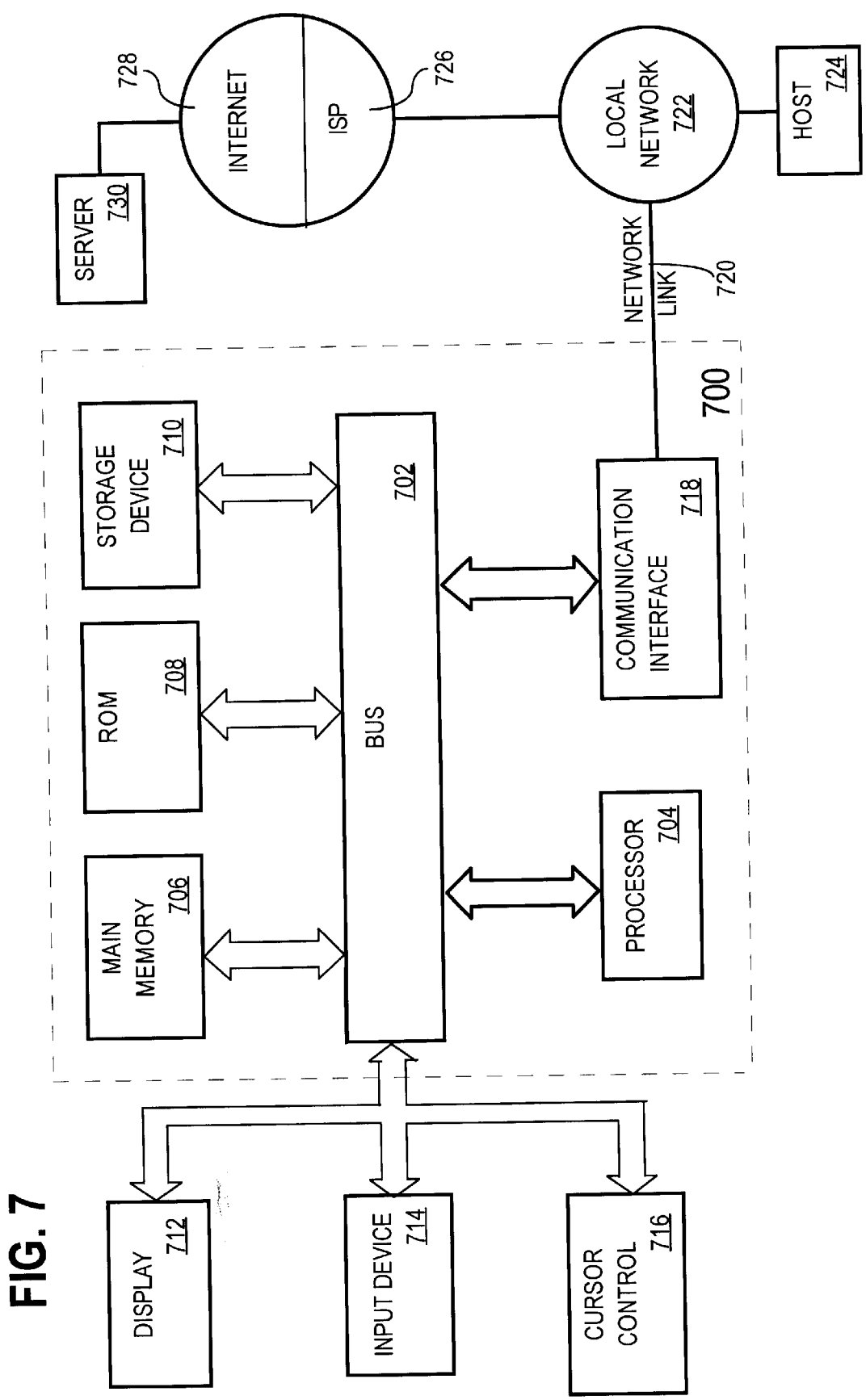
FIG. 7 is a block diagram that illustrates a computer system 600 upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing, in a database management system, a query referencing a plurality of tables of a database, the method comprising:
   determining whether a join should be performed between
      a first table of the plurality of tables and a second table of the plurality of tables based on
      a particular set of one or more columns of the second table referenced in the query and
      a join index on the first table for an index key column from the second table,
         wherein a join should be performed if:
            a particular column in the particular set is not an index key column in the join index, and
            the particular column is not in a join condition for the query that matches the join index; and
   if it is determined that the join should not be performed, processing the query without performing the join between the first table and the second table.

2. The method of claim 1, said step of determining whether the join should be performed further comprising determining whether the join should be performed based on properties of a query execution operation.

3. The method of claim 2, said step of determining whether the join should be performed further comprising determining whether the query execution operation preserves an association between a row in the first table and a value of the index key column.

4. The method of claim 3, said step of determining whether the join should be performed further comprising determining whether the query execution operation selects every row of the first table that satisfies all conditions in the query on the particular set of columns and selects no other row.

5. The method of claim 4, said step of determining whether the join should be performed further comprising determining that the join should be performed if the query execution operation does not preserve the association and does not select every row and no other row.

6. The method of claim 1, said step of determining whether the join should be performed further comprising:

determining whether every column in the particular set is either the index key column in the join index or in a condition for the query that matches a join condition for the join index; and if it is determined that every column is either the index key or in the condition that matches, then determining that the join should not be performed.

7. The method of claim 6, said step of determining that the join should not be performed further comprising determining that a query execution operation preserves an association between a row in the first table and a value of the index key column.

8. The method of claim 1, said step of determining whether the join should be performed further comprising:

determining whether every column in the particular set is either the index key column in the join index in a condition for the query serving to retrieve entries from the join index or in a condition for the query that matches a join condition for the join index; and if it is determined that every column is either the index key serving to retrieve entries or in the condition that matches, then determining that the join should not be performed.

9. The method of claim 8, said step of determining that the join should not be performed further comprising determining that a query execution operation selects every row of the first table that satisfies all conditions in the query on the particular set of columns and selects no other row.

10. A computer-readable medium carrying one or more sequences of instructions for processing, in a database management system, a query referencing a plurality of tables of a database, wherein execution of the one or more sequences of instructions by one or more processors causes the one or more processors to perform the steps of:

determining whether a join should be performed between a first table of the plurality of tables and a second table of the plurality of tables based on a particular set of one or more columns of the second table referenced in the query and a join index on the first table for an index key column from the second table, wherein a join should be performed if:

a particular column in the particular set is not an index key column in the join index; and the particular column is not in a join condition for the query that matches the join index; and if it is determined that the join should not be performed, processing the query without performing the join between the first table and the second table.

11. The computer-readable medium of claim 10, said step of determining whether the join should be performed further comprising determining whether the join should be performed based on properties of a query execution operation.

12. The computer-readable medium of claim 11, said step of determining whether the join should be performed further comprising determining whether the query execution operation preserves an association between a row in the first table and a value of the index key column.

13. The computer-readable medium of claim 12, said step of determining whether the join should be performed further comprising determining whether the query execution operation selects every row of the first table that satisfies all conditions in the query on the particular set of columns and selects no other row.

14. The computer-readable medium of claim 13, said step of determining whether the join should be performed further comprising determining that the join should be performed if the query execution operation does not preserve the association and does not select every row and no other row.

15. The computer-readable medium of claim 10, said step of determining whether the join should be performed further comprising:

determining whether every column in the particular set is either the index key column in the join index or in a condition for the query that matches a join condition for the join index; and if it is determined that every column is either the index key or in the condition that matches, then determining that the join should not be performed.

16. The computer-readable medium of claim 15, said step of determining that the join should not be performed further comprising determining that a query execution operation preserves an association between a row in the first table and a value of the index key column.

17. The computer-readable medium of claim 10, said step of determining whether the join should be performed further comprising:

determining whether every column in the particular set is either the index key column in the join index in a condition for the query serving to retrieve entries from the join index or in a condition for the query that matches a join condition for the join index; and if it is determined that every column is either the index key serving to retrieve entries or in the condition that matches, then determining that the join should not be performed.

18. The computer-readable medium of claim 17, said step of determining that the join should not be performed further comprising determining that a query execution operation selects every row of the first table that satisfies all conditions in the query on the particular set of columns and selects no other row.

* * * * *